Oct. 28, 1924.

A. R. STEVENS

CLEANER AND POLISHER

Filed Dec. 15, 1922     3 Sheets-Sheet 1

1,513,195

INVENTOR,
Augustus R. Stevens,
BY
Blakeslee & Brown,
ATTORNEYS.

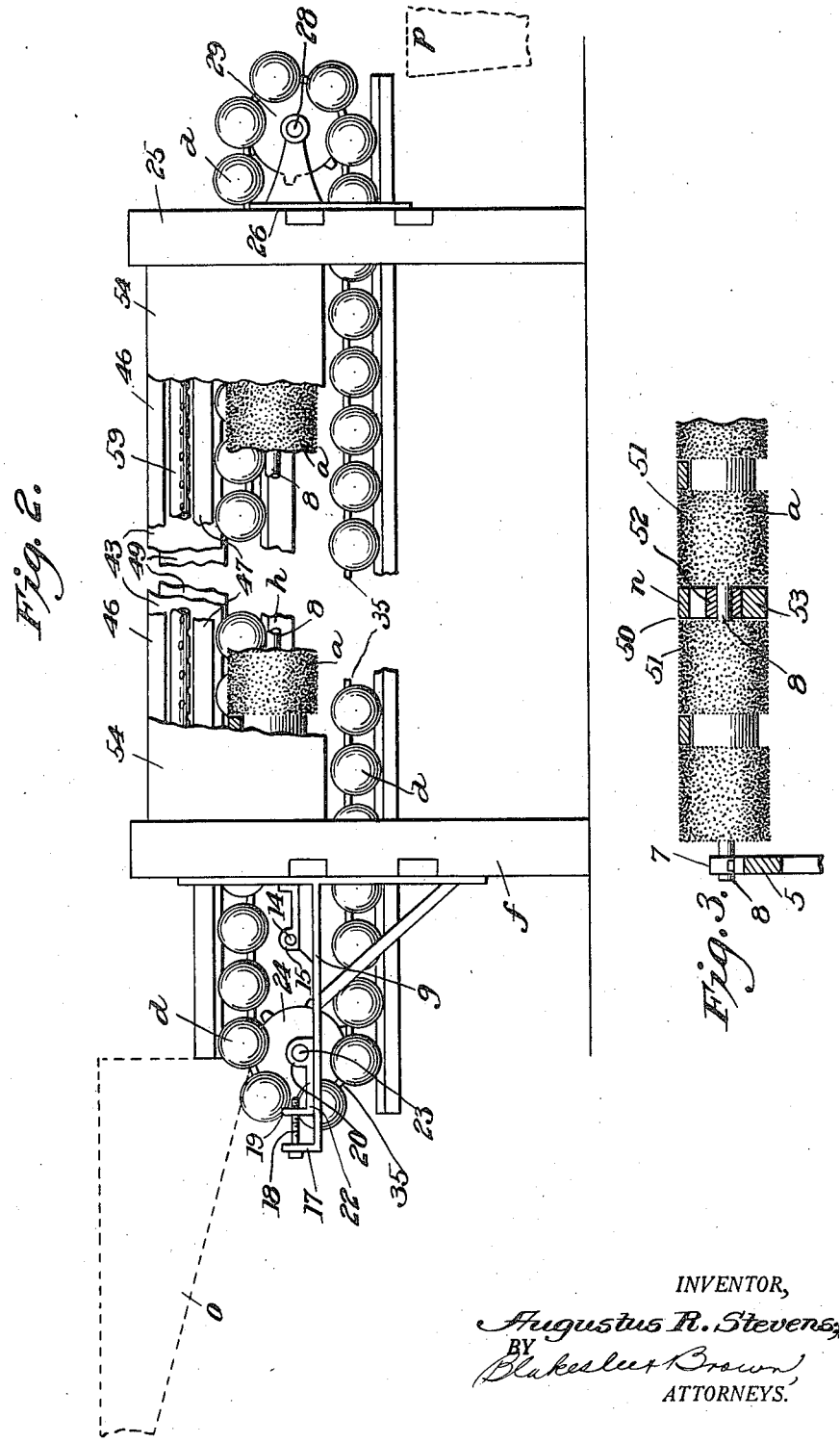

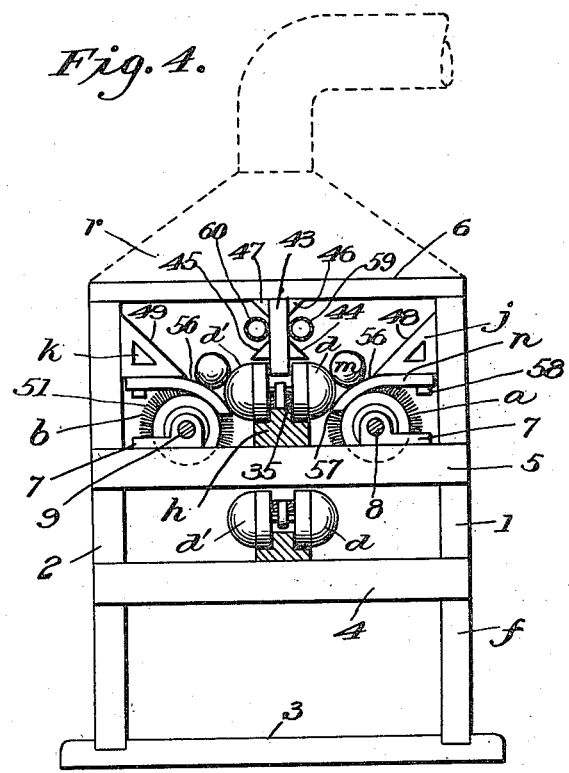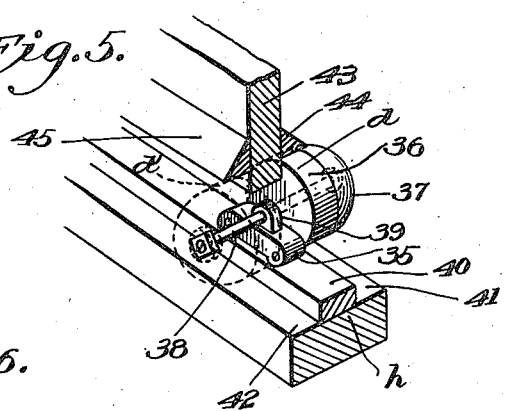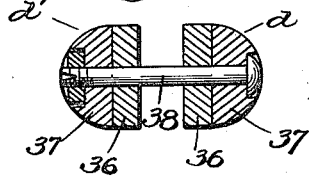

Patented Oct. 28, 1924.

1,513,195

UNITED STATES PATENT OFFICE.

AUGUSTUS R. STEVENS, OF LINDSAY, CALIFORNIA, ASSIGNOR OF FORTY-NINE ONE-HUNDREDTHS TO FRANCIS M. STEVENS, OF LINDSAY, CALIFORNIA.

CLEANER AND POLISHER.

Application filed December 15, 1922. Serial No. 607,212.

*To all whom it may concern:*

Be it known that I, AUGUSTUS R. STEVENS, a citizen of the United States, residing at Lindsay, in the county of Tulare and State of California, have invented new and useful Improvements in Cleaners and Polishers, of which the following is a specification.

This invention relates to cleaners and polishers, and particularly to that form of cleaner and polisher for use in packing houses or the like, for the purpose of removing dirt, dust and other deleterious substances from the skins of fruit, such as oranges, lemons, grape fruit and the like.

The invention has for an object the provision of a machine of this character which will ensure a proper cleaning of the skin of the fruit, which will accommodate a large amount of fruit and will not bruise or otherwise damage the fruit during the cleaning and polishing process.

In practicing the invention I may provide a suitable stand adapted to carry two or more rotatable brushes, with conveyers intermediate the brushes, said conveyers being provided with rotatable members. The fruit is received between one of the brushes and the rotatable members carried on the conveyers. A differential movement is provided by this arrangement, and the fruit is caused to revolve in various directions so that the brush may contact with the surface thereof and clean it thoroughly. At the present time it is customary to use a spiral brush, that is, one in which the bristles are spirally set upon a wooden drum, rotation of the brush, producing both a cleaning and a traveling action in the fruit. However, it has been found upon experiment that such a spiral brush does not clean fruit thoroughly, but rather produces a ring on the fruit, the ring part being clean and the other parts dirty. Furthermore, such a brush is expensive to manufacture and will last but a short time in actual use.

Further objects of my invention are to provide a cleaning and polishing machine which is simple of construction, convenient in use, which does not entail expensive parts, and which is positive in its action.

With the above and other objects in view, the invention consists in the novel and useful provision, formation, construction, association and inter-relation of parts, members and features, all as shown in certain embodiments in the accompanying drawings, described in the following statement, and finally set forth in the claims.

In the drawings:

Figure 2 is a fragmentary side elevation of the machine shown in Figure 1;

Figure 3 is a fragmentary side elevation of certain elements of construction in said machine;

Figure 4 is an end elevation, certain parts being in section, of the cleaner and polisher;

Figure 5 is a fragmentary perspective view of certain elements of the machine; and;

Figure 6 is a detail cross sectional view on an enlarged scale of the roller members and showing the means of connection therebetween.

Corresponding parts in all the figures are designated by the same reference characters.

Figure 1:
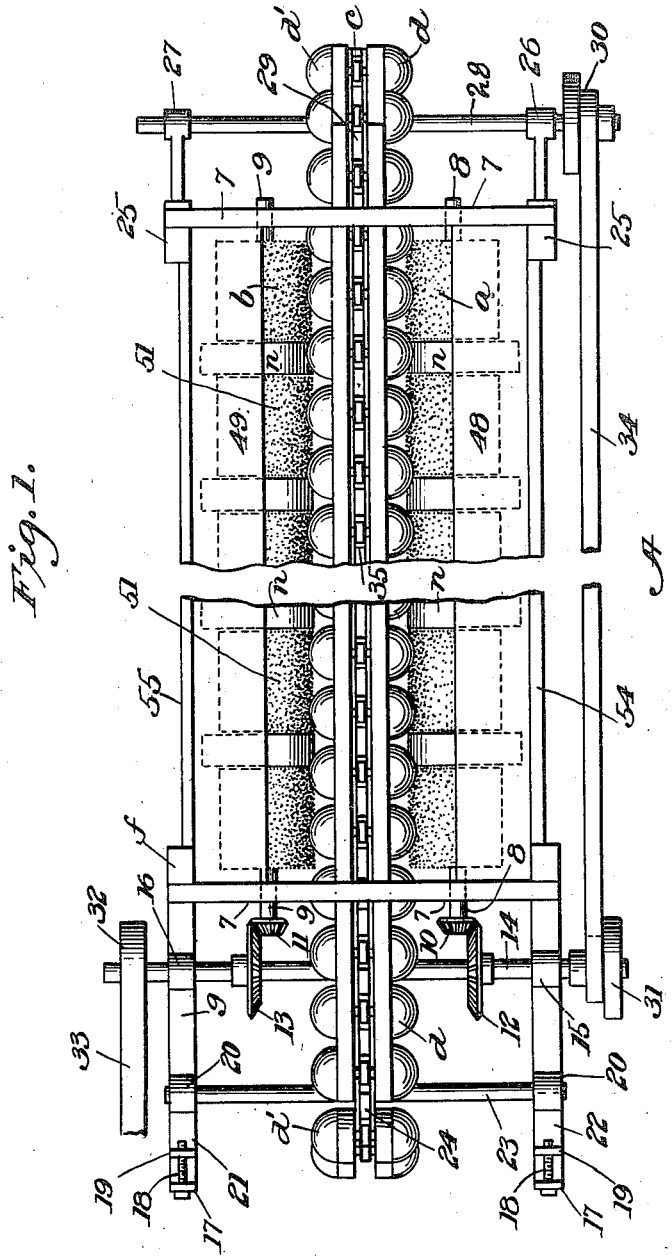
Figure 1 is a fragmentary top plan view of the cleaning and polishing machine.

Referring with particularity to the drawings, the improved cleaning and polishing machine is designated in its entirety and one embodiment by A, and said machine may comprise brush members *a* and *b*, and a traveling conveyer *c* provided with rollers *d* and *d'*. A suitable frame *f* is provided for supporting the various mechanisms of the machine, and said frame may include the usual uprights 1 and 2 mounted upon a base 3 with intermediate cross pieces 4, 5 and 6 associated with the uprights 1 and 2. The end cross pieces 5 carry bearings 7 adapted to receive shafts 8 and 9, the shaft 8 carrying the brush *a* and the shaft 9 carrying the brush *b*. Each shaft 8 and 9 is provided respectively with a bevel gear 10 and 11, and said bevel gears in turn mesh with bevel gears 12 and 13, the latter being mounted upon a shaft 14 which is received and carried in suitable bearing members 15 and 16 mounted upon a bracket extension *g* associated with the main frame member *f*, as best shown in Figure 2. The bracket extension *g* is provided with a part 17 adapted to receive a bolt 18, said bolt engaging a member 19 carried by a bearing 20. Two brackets *g* are provided, as shown in Figure 1 at 21 and 22, and the elements carried by each bracket are similar, and like reference characters will therefore apply to the like parts. A shaft 23 is interposed between the brackets 21 and 22 and carried by the bearings 20. Intermediate the shaft 23 is a sprocket wheel 24, the opposite end 25 of the frame $f$ is provided with two standards or brackets 26 and 27 having journaled portions, there being a shaft 28 carried within said journaled portions and a sprocket wheel 29 carried on and intermediate said shaft. The shaft 28 extends beyond the bracket 26 and carries thereon a step pulley wheel 30. The shaft 14 carries on one end a step pulley wheel 31 and the other end of said shaft carries a wheel 32. Thus by passing a continuous belt 33 over the wheel 32 and associating said belt with a suitable motor, the wheel 32 will rotate in turn the shaft 14, which will rotate the shafts 8 and 9 of the brushes $a$ and $b$ through the medium of the bevel gears 10, 12, and 11, 13. A continuous belt 34 may likewise pass between the pulley wheels 30 and 31 so that rotation may be communicated to the shaft 28. The means $c$ includes in part a continuous link chain 35 adapted to be carried between the sprocket wheels 24 and 29. In the showing, alternating links have joined therewith the roller members $d$ and $d'$ and said roller members may include short cylinders 36 provided with round heads 37. A bolt 38 interconnects the two rollers $d$ and $d'$. The rollers may be held to the bolt 38 in any approved manner, such as by counter-sinking the heads of said rollers for reception of the bolt head and of the bolt nut, and then splitting the end of the bolt so that the nut may not turn therefrom. The rollers $d$ and $d'$ are spaced a short distance from each other, as illustrated in Figures 4 and 5, and the chain member 35 of the conveyer $c$ is interposed between the said rollers with links of said chain provided with perforated studs 39 carried by each bolt 38. It is intended that the rollers $d$ and $d'$ should rotate during travel of the conveyer $c$, and to accomplish this rotation a track-way $h$ is provided. Said track-way $h$ extends beneath the conveyer $c$ and is supported upon the cross pieces 5 of each end of the frame $f$ and intermediate said cross pieces 5. Said track-way $h$ has a surface upon which the cylindrical part 36 of each roller $d$ and $d'$ may ride, with an intermediate raised portion 40 extending between the rollers $d$ and $d'$. In order to ensure rotation of the rollers $d$ and $d'$, surfaces 41 and 42 of the track-way are coated with some material to enchance friction as between said surfaces and the rollers, such substances as rubber, cork or the like, being used. It will thus be seen that the rollers are in a measure guided by the member 40 during movement. Immediately above the rollers and the chain may be a wall or partition 43 extending the length of the frame $f$ and attachable to the end cross pieces 6 of said frame, and said partition extends in part between the rollers $d$ and $d'$. This partition further ensures a correct guidance of the rollers during their movement, and likewise provides for a division as between the rollers $d$ and the brush $a$ and the rollers $d'$ and the brush $b$. The partition 43 may likewise carry triangular shaped members 44 and 45 immediately above the rollers $d$ and $d'$ respectively, as well as triangular shaped members 46 and 47 joined to the cross pieces 6 and to the partition 43. It will be noted that the bevel face of the triangular members 44 and 45 is tangent to a portion of the curved surface of the said rollers $d$ and $d'$.

Immediately above the brushes $a$ and $b$ are arranged bevel boards $j$ and $k$, and said bevel boards are joined with the upright members 1 and 2 of the frame $f$, with an inclined surface 48 and 49 of each bevel board directed downwardly toward their respective brushes. The bristles of each brush $a$ and $b$ are formed in any manner desired, it not being necessary to form them in a spiral, as fruit is caused to traverse said brushes through the medium of the conveyor. $m$ representes an orange which will be received between the brush $a$ and a roller or series of rollers $d$; the rollers $d$ having both translational and rotational movement and will move the orange $m$ along the brush $a$ and in addition tend to rotate the orange $m$. As the brush $a$ is likewise rotating there will be set up in the movement of the orange a differential rotation, the result of the rotations of the rollers $d$ and of the brush $a$. It will be seen that the belt 34 connecting the step pulleys 30 and 31 may be shifted to different steps so that the conveyor $c$ may move at variant speeds, and if the brushes were moving at one speed and the conveyer at another speed, various rotations would be imparted to the orange $m$. This will act as assurance that the skin of the orange will be properly cleansed by the bristles of the brush.

I have found it expedient, however, to provide means for causing fruit to lose momentum during its travel through the machine A, and this is accomplished in the present embodiment by dividing each brush $a$ and $b$ into what may be termed dead zone spaces. In particular the brush $a$ will be described in detail, and as the brush $b$ is similar, like refrence characters will apply thereto. As each brush is of considerable length, bearing members may be provided at different points for sustaining the weight of said brush, as well as any fruit received thereon. Thus at the point 50 bristles 51 of the brush may be cut away in addition to cutting away the core carrying said bristles, adjacent parts of the brush being keyed to its shaft, and bearing 52 similar to the bearing 7 may be carried on cross pieces 53 extending between the longérons 54 and 55 of the frame f, with the said bearings supporting the shafts 8 and 9, as the case may be. To compensate for the loss of bristles, I provide a curved member n, or a plurality of same, adapted to be interposed in the space that would normally be occupied by the bristles of the brush. A member n is curved as at 56 to correspond with the curvature of the brush. An end of same, as 57 extends slightly beyond the median center of the roller d or d'. The opposite end of the member n may be attached to the bottom of the bevel board j, as by suitable means 58. At other points in the brush a, as at 59, bristles of the brush may be removed from the core thereof and members n substituted for the bristles. The result will be that when the orange such as m contacts with the surface of the member n, the rotation given to said orange by the brush a or b will be stopped and the orange will be given a forward rotation by the member d, thus causing the orange to lose momentum, the result being that when the orange has been pushed off of the member n the fruit will automatically be revolved on a different axis of rotation. It will thus be seen that the bevel boards j and k are useful, in that any fruit thrown by the brushes a or b (said brushes revolving in opposite directions and clockwise for the brush a and in an anti-clockwise direction for the brush b), if thrown upwardly will contact with the bevel surfaces 48 or 49 and be directed back upon a brush. The members j and k will ensure that the fruit is not stripped or torn or bruised as the brushes are adapted to rotate at high speeds. If by chance the fruit should be thrown upwardly against the partition 43, the members 44 or 45, or 46 or 47 would tend to direct the fruit back against a brush and between the rollers d or d'. I may provide hoppers o and p at ends of the conveyer c so that the fruit may be automatically received as between the rollers d and d' and carried by said rollers in their movement between said rollers and the brushes, and after a thorough cleaning, finally deposited in the hopper p. In certain embodiments of the machine, I may provide pipes 59 and 60 attached to the partition 43 on opposite sides thereof, and which pipes are perforated and joined with a source of water supply so that the fruit may be sprayed. This will ensure a proper cleaning of the fruit while the fruit is being acted upon by the brushes. It will be noted that the rotation of the brushes a and b causes any dirt or dust to be thrown from said brushes by centrifugal action, and this ensures that the brushes are at all times maintained clean, with the dust gathered by a suction blower, not shown, in communication with a hood r immediately above the frame f, and attached thereto as illustrated in Figure 4. In this connection the first half of the brushes might be sprayed by water forced through the pipes 59 and 60, while a second part might not be sprayed, which part would therefore act as a polisher for the fruit. Different forms of bristles of course could be used for this operation in accordance with well understood methods, such as using the Tompica bristles for the part where the fruit is sprayed, and ordinary horse hair for the polishing part of the brushes. The chain of the conveyer c may be regulated as to tension by movement of the bolt 18.

A brief statement of the operation is as follows: Fruit may be deposited in the hopper o, whereupon it will be received between the rollers d and d' on opposite sides of the partition 43. Any amount of fruit may be deposited through the hopper upon the rollers, as fruit bearing against fruit will cause rotation of the fruit when certain of the fruit is rotated, and thus said fruit will be given a rotation as between the rollers and the brushes. Various dead zones of a brush with various members are introduced at spaced points in the brush for causing a loss of momentum of the fruit during its travel through the machine, and this will ensure that the skin of the fruit is properly cleaned. If desired, a suitable spraying device may be provided so that the fruit is sprayed by water during its travel through the machine, the rapid turning of the brushes ensuring that the water is thrown by centrifugal force from the brush and likewise from the fruit, whereupon the fruit will be passed through the drier, if desired. Certain portions of the machine may be used for polishing, and in this connection the means for spraying water would not be utilized.

It is obvious that various changes, modifications and variations may be made in practicing the invention in departure from the particular showing and description as given, and that said modifications and variations may be made without departure from the true spirit of the invention.

Having thus disclosed my invention, I claim and desire to secure by Letters Patent:

1. In a device of the character disclosed, a conveyer member, a brush member adjacent the conveyer, means for rotating said brush and moving said conveyer, a roller member associated with the conveyer and means for rotating said roller member when the conveyer is in movement.

2. In a device of the character disclosed, a frame, a cylindrical brush member carried by said frame, a conveyer adjacent said brush member and having a stretch thereof parallel with the axis of the brush member; said conveyer being provided with a series of spaced roller members provided with rounded heads adapted to be positively revolved when the conveyer is in movement, on an axis at angles to the axis of the brush member.

3. In a device of the character disclosed, for cleaning the surface of fruit, the combination, of a rotatable brush member, a conveyer, a series of spaced roller members associated with said conveyer, means for imparting rotation to said roller members, said fruit being received between the rotatable brush and the rotatable roller members of the conveyer, and whereby the fruit is given a differential rotation when the rotatable brush and the conveyer are in motion; there being means for changing the direction of rotation of the fruit as it traverses the bristles of the rotatable brush.

4. The combination, in a cleaning and polishing machine for fruit and like objects, of a conveyer member, said conveyer member including a series of roller members formed with a rounded head.

5. The combination, in a cleaning and polishing machine for fruit and like objects, of a conveyer member, said conveyer member including a continuous chain, and a series of roller members associated and carried thereby; said chain including the usual link members, and said roller members being placed on opposite sides of said links.

6. In a device of the character disclosed, the combination, with a suitable frame, of a cylindrical brush member rotatably carried by said frame, and means associated with the frame and with the brush member for forming dead zones at spaced points on said brush member.

7. In a device of the character disclosed, the combination, with a frame, of a cylindrical brush member mounted for rotation thereon, a conveyer carried by said frame and having a stretch thereof parallel with the longitudinal axis of said brush member, a track-way carried by the frame member and beneath said conveyer, and a series of spaced roller members associated with the conveyer and adapted to travel on said track-way, whereby rotation is imparted to said roller members.

8. In a device of the character disclosed, the combination, with a frame, of a cylindrical brush member mounted for rotation thereon, a conveyer carried by said frame and having a stretch thereof parallel with the longitudinal axis of said brush member, a track-way carried by the frame member and beneath said conveyer, and a series of spaced roller members associated with the conveyer and adapted to travel on said track-way, whereby rotation is imparted to said roller members; said roller members being adjacent the periphery of said brush member.

9. In a device of the character disclosed, the combination, with a frame, of a cylindrical brush member mounted for rotation thereon, a conveyer carried by said frame and having a stretch thereof parallel with the longitudinal axis of said brush member, a track-way carried by the frame member and beneath said conveyer, and a series of spaced roller members associated with the conveyer and adapted to travel on said track-way, whereby rotation is imparted to said roller members; said roller members being adjacent the periphery of said brush member; there being a bevel board carried by the frame and having a surface thereof tangential to the periphery of said brush member.

10. In a device of the character disclosed, the combination, with a frame, of a cylindrical brush member mounted for rotation thereon, a conveyer carried by said frame and having a stretch thereof parallel with the longitudinal axis of said brush member, a track-way carried by the frame member and beneath said conveyer, and a series of spaced roller members associated with the conveyer and adapted to travel on said track-way, whereby rotation is imparted to said roller members; said roller members being adjacent the periphery of said brush member; said roller members having rounded heads, the fruit being receivable as between the rounded heads of the roller members and the periphery of the brush.

11. In a device of the character disclosed, the combination, of a frame, a conveyer member carried by said frame, said conveyer member comprising a continuous link chain, roller members on opposite sides of said chain, a rotatable brush member adjacent the roller members, and divisioning means between said roller members.

12. In a device of the character disclosed, the combination, of a frame, a conveyer member carried by said frame, said conveyer member comprising a continuous link chain, roller members on opposite sides of said chain, a rotatable brush member adjacent each roller member, and divisioning means between said roller members; there being liquid spraying means carried by said divisioning means.

13. In a device of the character disclosed, the combination, with a conveyer, of roller members formed with rounded heads carried by said conveyer, a brush adapted for movement adjacent said roller members, and a member above the roller members, and tangential to the rounded heads thereof.

14. In a device for cleaning the skin of fruit, the combination with a conveyer, of roller members formed with rounded heads carried thereby, a brush adapted for movement adjacent said roller members, said fruit being received as between the brush and the roller members, and a member to one side of said roller members for directing any fruit thrown from the brush and the roller members back between said roller members and brush.

15. In a device for cleaning the skin of fruit, the combination with a conveyer, of roller members formed with rounded heads carried thereby, a brush adapted for movement adjacent said roller members, the said fruit being received as between the brush and the roller members, and a member to one side of said roller members for directing any fruit thrown from the brush and the roller members back between said roller members and brush; said member being tangential to the rounded heads of said roller members.

16. In a device of the character disclosed, the combination of a frame, a conveyer member carried by such frame, said conveyer comprising a continuous chain and roller members on opposite sides of said chain, there being rotatable brush members on opposite sides of such chain and adjacent such roller members.

17. In a device for cleaning the skin of fruit, the combination of a brush member and a series of closely spaced roller members adjacent such brush member, the fruit to be cleaned being received between and carried by adjacent roller members and the brush member.

18. In a device for cleaning the skin of fruit, the combination of a brush member, and a series of closely spaced roller members adjacent such brush member, the fruit to be cleaned being received between adjacent roller members and the brush member; there being means for positively rotating the roller members.

In testimony whereof, I have signed my name to this specification in the presence of two subscribing witnesses.

AUGUSTUS R. STEVENS.

Witnesses:
LUELLA CAPSIN,
O. C. RHINE.